Sept. 12, 1950   J. W. BRIDWELL ET AL   2,522,089
CLUTCH AND BRAKE FOR HYDRAULIC CABLE CONTROL
Filed Dec. 23, 1947   3 Sheets-Sheet 3
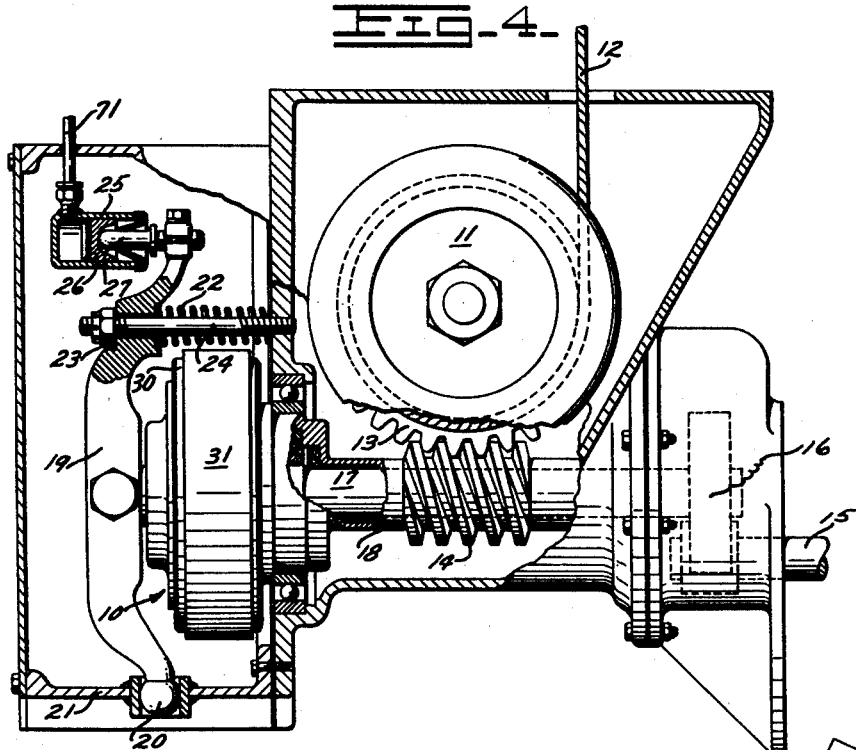
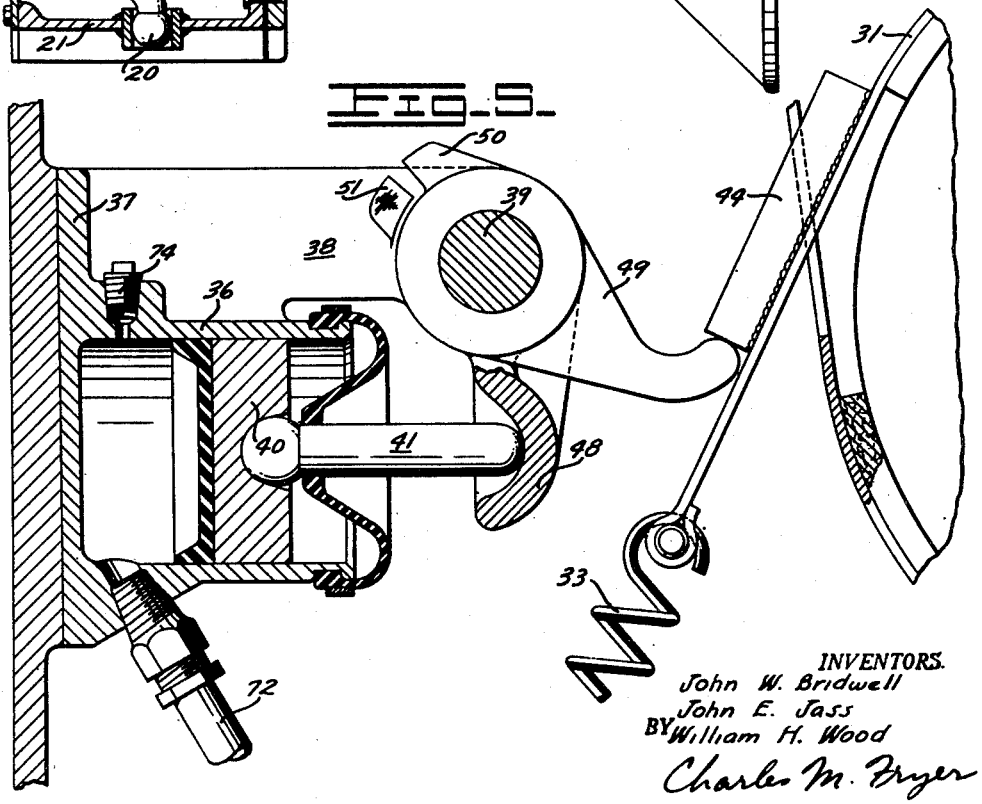
INVENTORS.
John W. Bridwell
John E. Jass
BY William H. Wood
Charles M. Fryer
ATTORNEY.

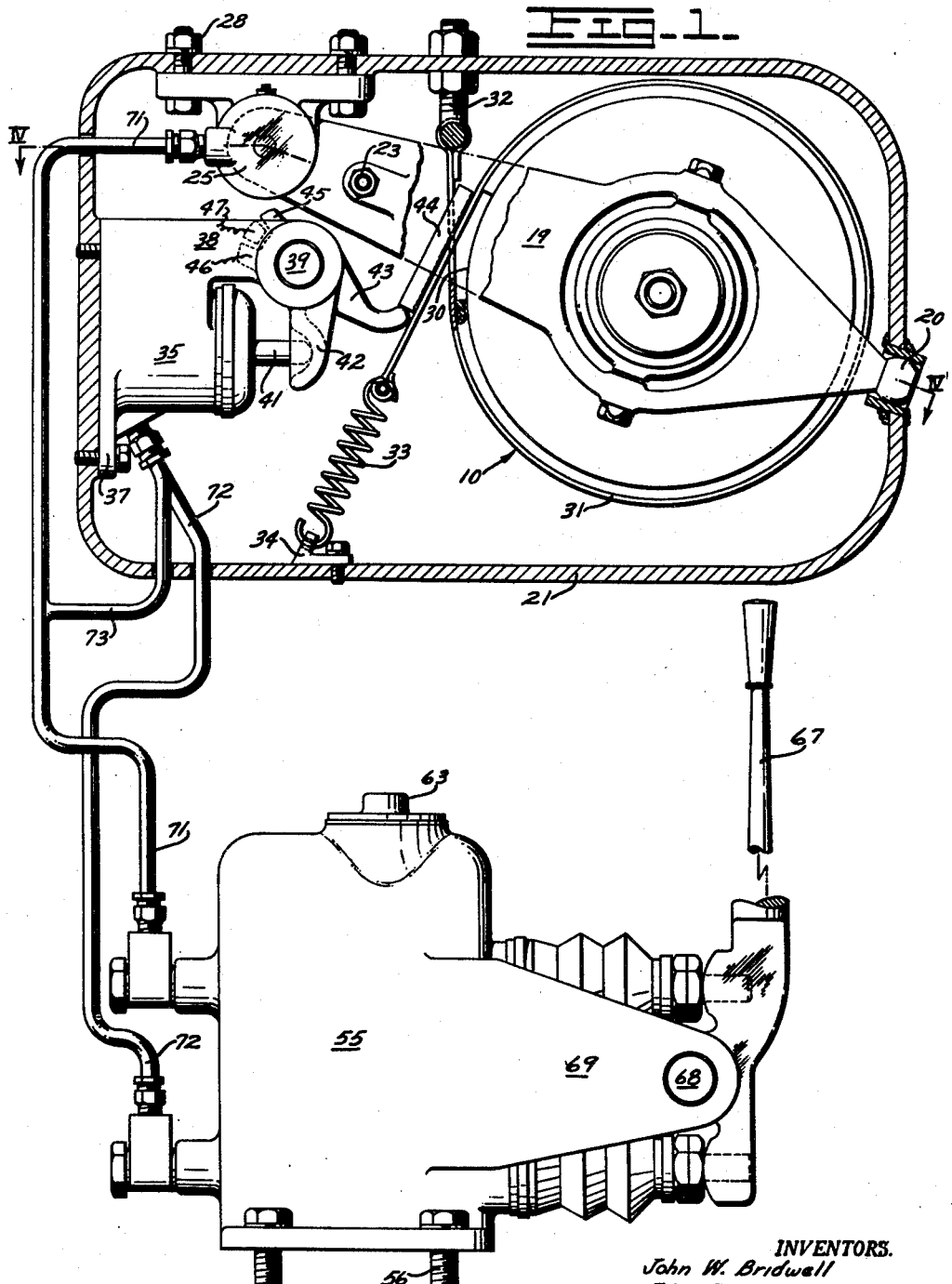
Sept. 12, 1950   J. W. BRIDWELL ET AL   2,522,089
CLUTCH AND BRAKE FOR HYDRAULIC CABLE CONTROL
Filed Dec. 23, 1947   3 Sheets-Sheet 1
INVENTORS.
John W. Bridwell
John E. Jass
BY William H. Wood
Charles M. Fryer
ATTORNEY

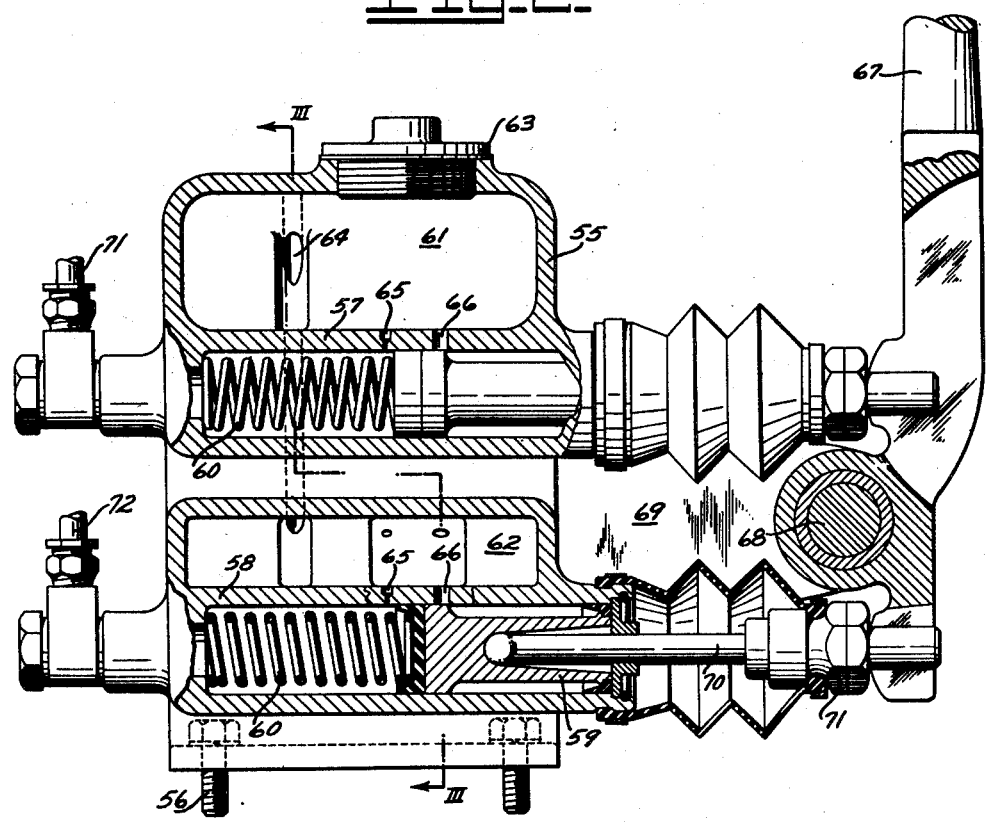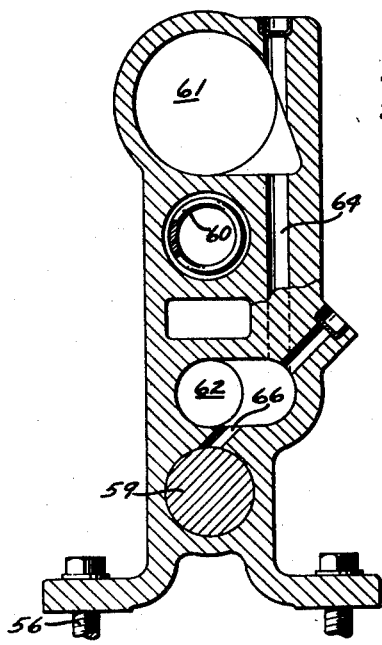

Patented Sept. 12, 1950

2,522,089

UNITED STATES PATENT OFFICE 2,522,089

CLUTCH AND BRAKE FOR HYDRAULIC CABLE CONTROL

John W. Bridwell, John E. Jass, and William H. Wood, Peoria, Ill., assignors to Caterpillar Tractor Co., Peoria, Ill., a corporation of California Application December 23, 1947, Serial No. 793,390

2 Claims. (Cl. 192—17)

1

This invention relates to controls for cable winding drums and particularly to a hydraulic mechanism associated with the clutch and brake which control the rotation of a cable winding drum.

The invention is shown herein in its application to a cable winding drum employed on a tractor for the purpose of taking in and paying out cable used for adjusting the operation of some tractor-operated implement such as a bulldozer or a tractor drawn scraper. It is, however, adaptable to use with other cable drums or winches as will be apparent from the following description.

Where the operation of a cable drum is controlled by a clutch and a brake it is customary to employ a normally applied brake and a normally disengaged clutch. When the clutch is employed to effect taking in of cable, the brake should be released to permit the drum to be driven. The brake releasing action is preferably delayed until after engagement of the clutch in order to prevent reverse rotation of the drum under cable load and consequent jarring or snapping of the cable when the clutch takes hold. Furthermore, it is at times desirable to release the brake without engaging the clutch to permit the cable to pay out freely under load tension. Frequently it is necessary to effect such control from a remote position as for example when the cable winding drum is mounted on the front or rear of a tractor and the controls therefor are situated at the operator's station. Under such conditions the mechanical linkages required are complex and difficult to adjust and maintain.

An object of the present invention is to provide a simple and positively acting hydraulic mechanism for actuating the clutch and brake associated with a cable control drum that is capable of performing the required functions set forth above and that eliminates the objectionable mechanical linkages commonly used. Further and more specific objects and advantages of the invention and the manner in which it is carried into practice are made apparent in the following specification by reference to the accompanying drawings.

In the drawings:

Fig. 1 is a view in schematic arrangement of a cable control mechanism and a control unit therefor, the housing of the cable control mechanism being shown in section to illustrate the arrangement of parts enclosed thereby;

Fig. 2 is a vertical central section through the control unit shown in Fig. 1;

Fig. 3 is a section taken on planes indicated by the line 3—3 in Fig. 2;

Fig. 4 is a section taken on the line 4—4 of Fig. 1 and also illustrating partially in section the arrangement of a cable winding drum and drive therefor associated with the cable control mechanism; and Fig. 5 is an enlarged fragmentary sectional view of one of the brake cylinders the other one of which is shown in Fig. 1.

Referring first to Figs. 1 and 4 of the drawings, a clutch and brake unit generally indicated at 10 is illustrated for controlling a cable winding drum 11 shown in Fig. 4, the cable wound upon the drum being shown at 12. The drum 11 is adapted to be driven through a gear 13 fixed to it and a worm 14 meshing with the gear. Power for driving the worm 14 may be taken from a conventional power take-off shaft of a tractor indicated at 15 which through conventional gears 16 continuously drives a shaft 17. The shaft 17 is connected with the driving part (not shown) of a clutch, usually of the multiple disc type, contained within the unit 10 and the driven part of this clutch is connected with a hollow shaft 18 embracing the shaft 17 and carrying the worm 14. The thrust action required for engagement of the clutch is applied through a lever 19 pivotally supported as at 20 in one wall of a control housing 21. The opposite end of the clutch lever 19 is urged toward a clutch disengaged position by a spring 22 bearing between the housing wall and the lever and limited in its action by a nut 23 adjustably carried on a stud 24. A hydraulic cylinder 25 having a reciprocable piston 26 therein is disposed in position for engagement of the free end of the lever 19 through a connecting rod 27. This cylinder 25 may be secured as shown in Fig. 1 to the wall of the control housing 21 as by bolts 28.

The outer periphery of the brake and clutch unit 10 forms a brake drum 30 secured to and rotatable with the driven part of the clutch so that it may be employed to control rotation of the cable drum 11. A brake band 31 encircles the drum 30 being permanently anchored at one end as by an adjustable post 32 extending through the housing 21. The opposite end of the brake band is anchored through the medium of the spring 33 to an anchor lug 34 also secured to the inner housing wall, the tension of the spring 33 normally tending to apply the brake.

The brake may be released by either one of a pair of hydraulic cylinders 35 and 36. The hydraulic cylinder 35 is illustrated in Fig. 1 and the cylinder 36 which is identical in construction and formed integrally on the same base pad 37 is shown in section in Fig. 5 and occupies a position adjacent to and directly behind the cylinder 35 as viewed in Fig. 1. A pair of bracket arms 38 extend forwardly from the base pad 37 and support a transverse shaft 39 which carries pivoted levers acting between the hydraulic cylinders 35 and 36 and the brake band 31. Each of the cylinders 35 and 36 include, as shown in Fig. 5, a reciprocable piston 40 connected as by a rod 41 with one of the levers on the shaft 39. The lever associated with the cylinder 35 is shown in Fig. 1 as having one arm 42 with a cupped end portion receiving the end of piston rod 41 and a second arm 43 with an end engageable beneath an abutment plate 44 secured to the brake band 31. Consequently, upon outward movement of the piston 40 in the cylinder the lever is swung about the shaft 39 to urge the brake band toward a released position against the tension of the spring 33. Spaced lugs 45 and 46 formed as a part of the same lever that carries the arms 42 and 43 engage the opposite sides of a stop lug 47 on one of the bracket arms 38 to limit the swinging movement of the lever in both directions. The lug 45 serves to limit the distance that the brake may be released while the lug 46 serves to limit the distance that the spring 33 may urge the brake toward a braking position. The lug 46 therefore serves in indicating when the brake band is in need of adjustment. For example if the brake lining wears to the extent that the brake slips when the spring 33 has tightened the band to the point where the lug 46 strikes the stop lug 47 the operator will realize the necessity of compensating for wear by adjustment of the anchor 32. The brake cylinder 36 has a similar lever with an arm 48 corresponding to the arm 42 and an arm 49 corresponding to the arm 43 and also engaging beneath the plate 44 on the brake band. A single stop member 50 on this lever acts against a lug 51 on the bracket arm 38 to limit the brake releasing action imposed by the brake cylinder 36.

A hydraulic pump mechanism of conventional design, shown in Figs. 1, 2 and 3, is employed to direct fluid under pressure selectively to the clutch actuating cylinder and the brake actuating cylinders. The pump mechanism, as best shown in Figs. 2 and 3, comprises a cast housing 55 adapted to be secured as by screws 56 in a convenient position adjacent the operator's station on the tractor. The housing includes a pair of pump cylinders 57 and 58, each having a pump plunger 59 therein urged to a retracted position by a spring 60. Also within the housing 55 are a pair of reservoirs, one shown at 61 disposed above the cylinder 57 and the other at 62 above the cylinder 58. These reservoirs are adapted to be filled with a liquid such as oil through an opening closed by a removable cap 63 in the uppermost reservoir 61. A passage 64 connects the reservoirs so that they may be filled through the same opening.

Each of the cylinders 57 and 58 is supplied with oil from its respective reservoir through a port 65 communicating with the cylinder just in advance of the piston in its retracted position. A larger port 66 is similarly positioned just behind the plunger to permit the escape of oil into the reservoir as the plunger is retracted. A single operating lever 67 is pivotally supported as at 68 between brackets 69 which extend from the housing 55. Connecting rods, one of which is shown at 70 in Fig. 2, connect the plungers of the pump cylinders with the lever 67. Each of the connecting rods extends into a bifurcated portion of the lever, one above and one below its pivotal support 68, and adjustable nuts 71 on the plungers provide bearing surfaces against which the lever acts. With this construction, rocking movement of the lever 67 about its support 68 in opposite directions selectively effects advancement of the plungers in the pump cylinders 57 and 58. For example, if the lever is rocked to the left, as viewed in Fig. 2, the plunger is advanced in the cylinder 57 to eject oil under pressure outwardly through a discharge conduit 71. Likewise, if the lever 67 is moved toward the right the plunger in the cylinder 58 is advanced to discharge oil under pressure through a discharge conduit 72.

Referring now to Fig. 1 of the drawings the discharge conduit 71 is shown as communicating with the clutch cylinder 25 and as having a branch 73 communicating simultaneously with brake cylinder 35. The discharge conduit 72 on the other hand communicates only with the brake cylinder 36, the manner of communication being shown in Fig. 5. This figure also shows the brake cylinders as having vent openings closed by plugs 74 to enable venting when the system is being primed with oil.

With the apparatus described herein the operator of a tractor has full required control over both the brake and clutch through simple manipulation of the single operating lever 67. When the lever is swung in one direction, liquid from the pump 57 is directed through the conduit 71 to the clutch cylinder and at the same time the brake cylinder 35. The brake spring 33 is larger or more heavily loaded than the clutch release spring 22. Due to this differential, the fluid in the clutch cylinder 25 first overcomes the tension of the spring 22 to effect engagement of the clutch and almost immediately thereafter becomes effective in the brake cylinder 35 to release the brake by application of force through the lever arms 42 and 43. Thus with the clutch engaged and the brake released the cable winding drum is driven in a manner to take in on the cable 12.

When it is desired to pay out on the cable 12 the lever 67 is swung in the opposite direction to exert pressure by the pump 58 through the conduit 72 and thence to the brake releasing cylinder 36. As no fluid has been directed to the clutch cylinder by this operation the clutch remains in its disengaged position and releasing of the brake permits rotation of the cable drum to pay out cable under the tension of a load.

We claim:

1. In control mechanism for a cable drum including a clutch normally disengaged by a spring, and a brake normally engaged by a spring, a pair of hydraulic cylinders connected with the clutch and brake, and means for directing pressure to both cylinders to effect engagement of the clutch and release of the brake, said brake spring being under greater tension than the clutch spring whereby equal pressure in said cylinders will effect engagement of the clutch prior to release of the brake.

2. In control mechanism for a cable drum including a clutch normally disengaged by a spring, and a brake normally engaged by a spring, a pair of hydraulic cylinders connected with the clutch and brake and means for directing pressure to both cylinders to effect engagement of the clutch and release of the brake, said brake spring being under greater tension than the clutch spring whereby equal pressure in said cylinders will effect engagement of the clutch prior to release of the brake, a separate cylinder associated with the brake for releasing the brake without engaging the clutch, and means for directing fluid under pressure to said separate cylinder.

JOHN W. BRIDWELL.
JOHN E. JASS.
WILLIAM H. WOOD.

REFERENCES CITED

The following references are of record in the file of this patent:

UNITED STATES PATENTS

| Number    | Name           | Date          |
|-----------|----------------|---------------|
| 1,864,126 | Ferris         | June 21, 1932 |
| 2,220,517 | Friedman       | Nov. 5, 1940  |
| 2,270,431 | Freeman        | Jan. 20, 1942 |
| 2,279,597 | Selmer         | Apr. 14, 1942 |
| 2,308,299 | Page           | Jan. 12, 1943 |
| 2,366,433 | Bridwell et al.| Jan. 2, 1945  |
| 2,433,433 | Edge           | Dec. 30, 1947 |